3,118,886
3-AMINO-4':7'-PHENANTHROLINE
[5':6'-e]-1:2:4-TRIAZINES
Paul Schmidt, Therwil, and Eduard Schumacher and Max Wilhelm, Basel, Switzerland, assignors to Ciba Corporation, New York, N.Y., a corporation of Delaware
No Drawing. Filed Mar. 7, 1962, Ser. No. 177,994
Claims priority, application Switzerland Mar. 16, 1961
12 Claims. (Cl. 260—247.5)

This invention concerns 4':7'-phenanthrolino [5',6'-e]-1:2:4-triazines having the nucleus of the formula

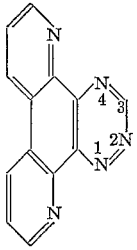

and which contain an amino group in the 3-position, and salts of these compounds.

The amino group in the new compounds may be free or substituted. As substituents there may be mentioned above all free or substituted hydrocarbon radicals or an amino group, in which latter case the substituent in the 3-position is a hydrazino group.

As hydrocarbon radicals there may be mentioned especially aliphatic hydrocarbon radicals, above all lower alkyl, alkenyl or alkylene radicals. As substituents these hydrocarbon radicals may contain, for example, free or substituted hydroxyl, mercapto or amino groups, halogen atoms, alkyl radicals. Alkyl radicals may also be substituted by hetero atoms, such as oxygen, nitrogen or sulfur, in such manner that two alkyl radicals are linked together through a hetero bridge; as examples there may be mentioned oxa-, aza- and thia-alkylene radicals, in which the aza group may be substituted, by hydrocarbon radicals e.g. of the above kind or by acyl radicals such as lower alkanoyl or carbamyl radicals, for example acetyl, N-lower alkyl or N:N-di-lower alkyl-carbamyl. The above mentioned substituted hydroxyl, amino or thio groups may contain as substituents, for example, hydrocarbon radicals of the above kind, and especially alkyl radicals or in the case of amino groups also alkylene radicals or oxa-, aza- or thia-alkylene radicals.

The amino group in the 3-position may therefore be mono- or disubstituted, for example, by alkyl, alkenyl, hydroxyalkyl, aminoalkyl, di-lower alkyl-aminoalkyl, alkyleneamino-alkyl, piperazinoalkyl, morpholino-alkyl, pyrrolidinoalkyl, piperidinoalkyl, alkylene, oxaalkylene, azaalkylene, N-lower alkyl-azaalkylene, N-carbamyl-azaalkylene, N-(lower alkyl-carbamyl or di-lower alkyl-carbamyl)-azaalkylene, oxa- or thia-alkylene radicals. The alkyl radicals are more especially lower alkyl radicals, for example, methyl, ethyl, propyl, isopropyl, branched or straight chain butyl, pentyl or hexyl radicals bound in any desired position. Alkylene radicals are, for example, butylene, pentylene, hexylene and heptylene radicals, for example, butylene-(1:4), pentylene-(1:5), hexylene-(2:5), or heptylene-(2:6). Azaalkylene radicals are advantageously piperazino radicals.

The new compounds may contain further substituents, for example, in the pyridine rings, lower alkyl radicals, especially methyl groups.

The new compounds possess valuable pharmacological properties. In particular they possess antibacterial and antiparasitic activity. More particularly they are active against parasitic protozoa and worms in the intestine of man or animal and vermiculae occurring in organs other than the intestine, especially against Trypanosomae, Amoebae, Oxyuris, *Distoma hepaticum*. They can therefore be used pharmacologically in the animal or as medicaments or prophylactics in human or veterinary medicine. Moreover, they are suitable as additives for animal fodder, and also as intermediates for the preparation of medicaments.

Especially valuable are compounds of the formula

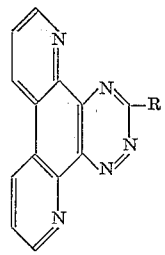

and salts thereof, in which R represents a hydrazine group or a lower mono- or dialkylamino, alkylene-amino, oxa- or aza-alkyleneamino, hydroxy lower alkylamino- or lower dialkylamino- lower alkylamino group, such as a morpholino, piperidino, piperazine, N-methyl-piperazino, N-carbamyl-piperazino, N-(dimethylcarbamyl)-piperazino, N-(ethylcarbamyl)-piperazino or an N-(diethylcarbamyl)-piperazino group, or a hydroxy-, dimethylamino-, diethylamino- or dipropylamino-ethylamino or propylamino group and above all valuable are 3-hydrazino-4':7'-phenanthrolino[5',6'-e]-1:2:4-triazine, 3-dimethylamino and 3-piperazino - 4':7' - phenanthrolino[5',6'-e]-1:2:4-triazine and salts thereof.

The new compounds can be made by methods in themselves known. Advantageously a 4':7'-phenanthrolino-[5',6'-e]-1:2:4-triazine which contains in the 3-position a free mercapto or an alkyl-mercapto group is reacted with a compound containing an amino group having at least one hydrogen atom, for example, ammonia or an appropriate amine or hydrazine.

In resulting compounds with an N-unsubstituted aza-alkylene group the latter can be N-acylated, for example carbamylated, in the conventional manner, advantageously with a corresponding acid halide, for example chloride, in the presence of an acid-binding condensing agent, or in the case of carbamyl radicals also with isocyanates.

The reactions may be carried out by methods in themselves known in the presence or absence of a diluent or condensing agent at the ordinary or advantageously a raised temperature at atmospheric or superatmospheric pressure.

The invention includes also the 4':7'-phenanthrolino[5',6'-e]-1:2:4-triazines which contain in the 3-position an alkyl mercapto group. These substances are new and possess antibacterial and antifungoid activity. They can be made in the usual manner, that is to say by the etherification of the free mercapto-compounds.

Depending on the procedure used the new compounds are obtained as the free bases or in the form of salts thereof. As salts there may be mentioned more especially those of therapeutically usable acids, such as inorganic acids, for example, hydrohalic acids, for example, hydrochloric or hydrobromic acid, perchloric acid, nitric acid or thiocyanic acid, sulfuric or phosphoric acids, or organic acids such as formic acid, acetic acid, propionic acid, glycollic acid, lactic acid, pyroracemic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicylic acid, 4-aminosalicylic acid, 2-phenoxy-benzoic acid, 2-acetoxy-benzoic acid, methane-sulfonic acid, ethane sulfonic acid, hydroxy-ethane sulfonic acid, benzene sulfonic acid, para-toluene sulfonic acid, naphthalene sulfonic acid or methionine, tryptophan, lysine or arginine.

Salts obtained by the process can be converted in the usual manner into the free bases, and the free bases may be converted into salts thereof, for example, those referred to above. The salts may also be used to purify the free bases.

The new compounds can be used as medicaments, for example, in the form of pharmaceutical preparations which contain the compound or a salt thereof in admixture with an organic or inorganic, solid or liquid carrier suitable for enteral, parenteral or topical administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, salves, creams or in liquid form as solutions, suspensions or emulsions. If desired they may be sterilized and/or may contain auxiliary substances such as preserving, stabilizing, wetting or emulsifying agents, salts for regulating the osmotic pressure or buffers. They may also contain other therapeutically valuable substances. The preparations can be made up by the usual methods. The new compounds may also be used in the form of animal feeds or animal feed additives, together with customary feedstuffs and/or carriers.

The following examples illustrate the invention:

*Example 1*

A solution of 6.5 grams of 3-mercapto-4':7'-phenanthrolino[5',6'-e]-1:2:4-triazine and 20 cc. of hydrazine hydrate in 150 cc. of ethyl alcohol is heated for 4 hours at the boil, during which hydrogen sulfide is evolved. The whole is then allowed to cool and filtered with suction to separate the precipitate. By recrystallizing the precipitate from a large quantity of boiling ethyl alcohol there is obtained 3-hydrazino-4':7'-phenanthrolino[5',6'-e]-1:2:4-triazine of the formula

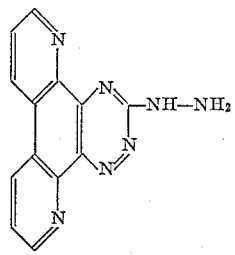

in the form of brown crystals melting at 238–239° C.

The 3-mercapto - 4:7' - phenanthrolino[5',6'-e]-1:2:4-triazine used as starting material is obtained as follows:

A suspension of 21 grams of 4:7-phenanthroline-5:6-quinone and 9.1 grams of thiosemicarbazide in 600 cc. of methanol is boiled under reflux for 10 hours. The whole is then filtered hot and the resulting 3-mercapto-4':7'-phenanthrolino[5',6'-e]-1:2:4-triazine is obtained as brown crystals melting at 266–267° C. with decomposition.

*Example 2*

14 grams of 3-methylmercapto - 4':7' - phenanthrolino[5',6'-e]-1:2:4-triazine are heated in a closed tube for 10 hours at 120° C. with 40 cc. of liquid dimethylamine. After evaporating the excess of dimethylamine, the residue is recrystallized from a large quantity of ethyl alcohol. 3-dimethylamino-4':7'-phenanthrolino[5',6'-e]-1:2:4-triazine of the formula.

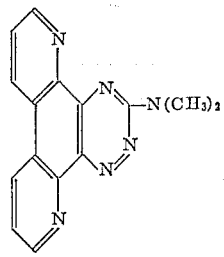

is obtained in the form of yellow crystals melting at 264–265° C.

The 3-methylmercapto - 4':7' - phenanthrolino[5',6'-e]-1:2:4-triazine used as starting material is obtained as follows:

To a solution of 13 grams of 3-mercapto-4':7'-phenanthrolino[5',6'-e]-1:2:4-triazine in 100 cc. of a 1 N-solution of caustic soda are slowly added, while stirring, 7 grams of dimethyl sulfate. The whole is stirred for a further 3 hours at room temperature, and then the alkaline solution is extracted with a large amount of chloroform. The yellow colored crystalline residue obtained from the chloroform is recrystallized from a large quantity of methanol. In this manner there is obtained 3-methylmercapto-4:7'-phenanthrolino[5',6' - e] - 1:2:4 - triazine of the formula

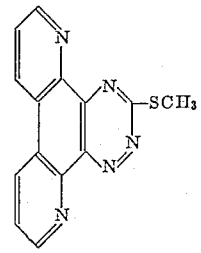

in the form of yellow crystals melting at 283–284° C.

*Example 3*

14 grams of 3-methylmercapto - 4':7' - phenanthrolino[5',6'-e]-1:2:4-triazine are heated with 70 cc. of N-methyl-piperazine for 6 hours in an oil bath having a temperature of 150° C., during which methyl mercaptan is evolved. The whole is allowed to cool, the crystalline product which precipitates is separated and purified by recrystallization from a large amount of ethyl alcohol. There is obtained 3-(N-methyl-piperazino)-4':7'-phenanthrolino[5',6'-e]-1:2:4-triazine of the formula

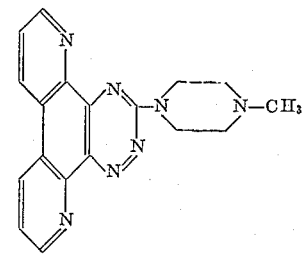

in the form of yellow crystals melting at 285–287° C.

*Example 4*

20 grams of 3-methylmercapto-4':7'-phenanthrolino[5',6'-e]-1:2:4-triazine are suspended in 750 cc. of ethanol and, charged with 7 atmospheres gauge pressure of ammonia, heated for 15 hours at 150° C. in a bomb tube. The reaction mixture is filtered to yield 16 grams of a grey-green substance. The latter is boiled in a little alcohol and filtered hot. The yellow residue is recrystallized from a mixture of chloroform and petroleum ether to yield intensely yellow 3-amino-4':7'-phenanthrolino-[5',6'-e]-1:2:4-triazine of the formula

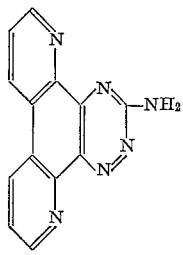

melting above 360° C.

Example 5

7 grams of 3-methylmercapto-4':7'-phenanthrolino-[5',6'-e]-1:2:4-triazine are heated under reflux for 48 hours with 100 cc. of piperidine, then cooled and suction-filtered, 7.8 grams of yellow powder melting at 302–303° C. being obtained. A solution of the latter in chloroform is filtered through aluminum oxide evaporated and the residue recrystallized from a mixture of chloroform and petroleum ether to yield 3-piperidino-4':7'-phenanthrolino[5',6'-e]-1:2:4-triazine of the formula

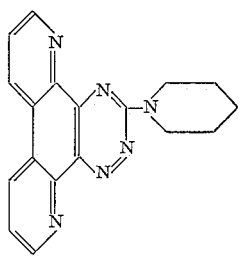

in the form of fine yellow needles melting at 303–305° C.

In the same way and using 3-mercapto-4':7'-phenanthrolino[5',6'-e]-1:2:4-triazine as starting material the above end product can be obtained.

Example 6

20 grams of 3-methylmercapto-4':7'-phenanthrolino-[5',6'-e]-1:2:4-triazine are heated under reflux for 36 hours with 150 grams of piperazine and 100 cc. of methyl cellosolve with stirring; boiling isopropyl ether is added at 100° C. and the mixture then filtered hot. As residue there remain 18 grams of a brown-yellow powder. The latter is dissolved in chloroform, the solution filtered through aluminum oxide, evaporated and the residue recrystallized from a mixture of chloroform, ether and pentane. There is obtained 3-piperazino 4':7'-phenanthrolino[5',6'-e]-1:2:4-triazine of the formula

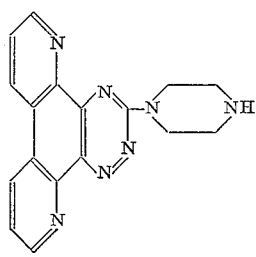

as a yellow product melting at 292–294° C.

Example 7

10 grams of 3-methylmercapto-4':7'-phenanthrolino-[5',6'-e]-1:2:4-triazine are heated under reflux with 100 cc. of morpholine for 48 hours, then cooled and suction-filtered, 9 grams of yellow product being obtained. Recrystallization from a mixture of chloroform, ether and petroleum ether yields 3-morpholino-4':7'-phenanthrolino[5',6'-e]-1:2:4-triazine of the formula

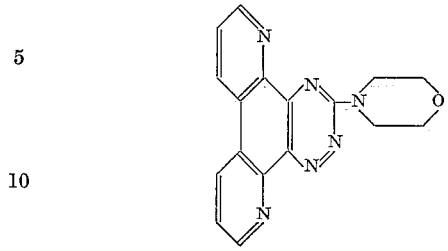

as a yellow product melting at 341° C.

Example 8

9 grams of 3-piperazino-4':7'-phenanthrolino[5',6'-e]-1:2:4-triazine are dissolved in 210 cc. of hydrochloric acid, treated with 3.3 grams of dimethylcarbamic acid chloride and 9 cc. of trimethylamine and the whole heated for 1 hour under reflux. The chloroform solution is washed with 2 N-sodium carbonate and with water, dried over sodium sulfate, treated with one-third part by volume of ether and filtered through aluminum oxide. After evaporation the residue is recrystallized from a mixture of alcohol and ethyl acetate to yield 3-[N-(dimethylcarbamyl) - piperazino] - 4':7' - phenanthrolino[5',6'-e]-1:2:4-triazine of the formula

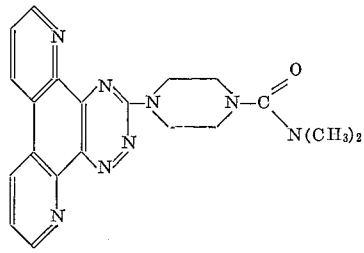

as yellow crystals melting at 301° C. (with decomposition).

Example 9

8 grams of 3-piperazino-4':7'-phenanthrolino[5',6'-e]-1:2:4-triazine are dissolved in 210 cc. of chloroform, 3.0 grams of ethyl isocyanate are added and the whole heated under reflux for 5 hours. The cooled solution is treated with petroleum ether and the precipitating, maize-yellow product suction-filtered (7.8 grams). Recrystallization from much alcohol and petroleum ether yields 3 - [N-(ethylcarbamyl)-piperazino]-4':7'-phenanthrolino-[5',6'-e]-1:2:4-triazine of the formula

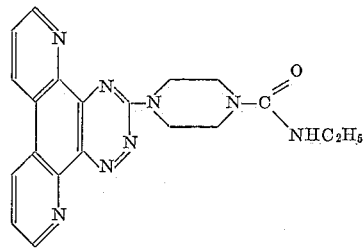

melting at 298–300° C. (with decomposition).

Example 10

A filtered solution of 10 grams of 3-piperazino-4':7'-phenanthrolino[5',6'-e]-1:2:4-triazine in 200 cc. of chloroform is treated with 30 cc. of triethylamine and 4.7 grams of diethyl-carbamic acid chloride, and the whole heated under reflux for 12 hours. The clear, brown solution is washed with 2 N-sodium carbonate, then with water, dried, treated with one-third part by volume of ether and filtered through aluminum oxide. On evaporation there is obtained 10.5 grams of 3-[N-(diethylcarbamyl) - piperazino]-4':7'-phenanthrolino[5',6'-e]-1:2:4-triazine of the formula

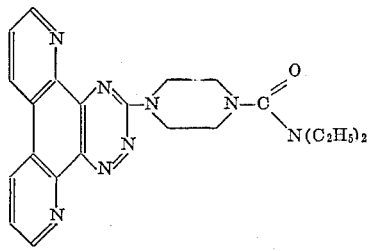

melting at 239° C.

*Example 11*

10 g. of 3-methylmercapto-4',7'-phenanthrolino-[5',6'-e]-1,2,4-triazine are refluxed for 12 hours with 25 cc. of diethylamino-ethylamine in 25 cc. of ethanol. On cooling, yellow crystals separate which are then recrystallized from methylene chloride+petroleum ether. There are obtained in this manner crystals of 3-β-diethylaminoethylamino-4',7'-phenanthrolino[5',6'-e]-1,2,4-triazine of the formula

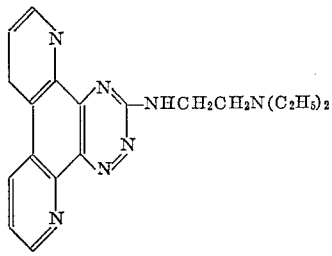

melting at 120–125° C.

*Example 12*

10 g. of 3-methylmercapto-4'7'-phenanthrolino-[5',6'-e]-1,2,4-triazine are stirred while being heated at 150° C. for 24 hours with 30 cc. of ethanolamine. A yellow precipitate is formed which is filtered off and extracted at the boil with ethanol. The 3-β-hydroxy-ethylamino-4',7'-phenanthrolino[5',6'-e]-1,2,4-triazine of the formula

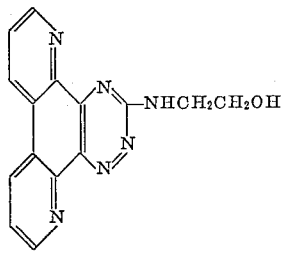

remains undissolved and is filtered off. The compound is obtained in the form of a yellow powder and melts above 300° C.

What is claimed is:

1. A member selected from the group consisting of 4':7'-phenanthroline[5':6'-e]1:2:4-triazines having the formula

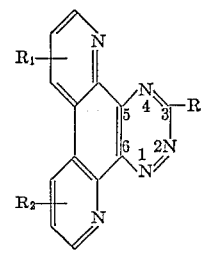

wherein $R_1$ and $R_2$ are members selected from the group consisting of hydrogen and lower alkyl and wherein R is a member selected from the group consisting of hydrazino and an amino group of the formula

wherein $R_3$ and $R_4$ represent members selected from the group consisting of hydrogen, lower alkyl, hydroxy-lower alkyl, amino-lower alkyl, di-lower alkylamino-alkyl, lower alkyleneaminoalkyl, piperazinoalkyl, morpholinoalkyl and, when taken together, lower alkylene, monooxa-lower alkylene, monoaza-lower alkylene, and N-$R_5$-monoaza-lower alkylene, wherein $R_5$ is a member selected from the group consisting of lower alkyl, $H_2N$—CO—, lower alkyl -NH—CO— and di(lower alkyl)-N—CO, and therapeutically useful salts thereof.

2. 3-hydrazino-4':7'-phenanthrolino[5':6'-e]-1:2:4-triazine.

3. 3 - dimethylamino - 4':7' - phenanthrolino[5':6'-e]-1:2:4-triazine.

4. 3-R-4':7'-phenanthrolino-[5':6'-e]-1:2:4-triazine, in which R is unsubstituted piperazino.

5. 3-piperidino-4':7'-phenanthrolino - [5':6'-e]-1:2:4-triazine.

6. 3-morpholino-4':7'-phenanthrolino - [5':6'-e]-1:2:4-triazine.

7. 3 - (N - methyl-piperazino) - 4':7' - phenanthrolino-[5':6'-e]-1:2:4-triazine.

8. 3-[N-(dimethylcarbamyl)-piperazino]-4':7'-phenanthrolino[5':6'-e]-1:2:4-triazine.

9. 3-[N-(diethylcarbamyl)-piperazino]- 4':7' - phenanthrolino[5':6'-e]-1:2:4-triazine.

10. 3-[N-(ethylcarbamyl)-piperazino] - 4':7' - phenanthrolino[5':6'-e]-1:2:4-triazine.

11. 3-β-diethylaminoethylamino-4':7' - phenanthrolino-[5':6'-e]-1:2:4-triazine.

12. 3-β - hydroxy - ethylamino - 4':7' - phenanthrolino-[5':6'-e]-1:2:4-triazine.

References Cited in the file of this patent

Schmidt et al: Helv. Chim. Acta, vol. 40, pp.350–355, 1957.

Erickson et al.: The 1,2,3- and 1,2,4-Triazines, Tetrazines and Pentazines, Interscience Pub. Inc., New York, 1956, p. 109.